July 15, 1958
V. RAKOWSKY
2,843,265
METHOD OF DENSITY SEPARATION
Filed July 17, 1956
2 Sheets-Sheet 1
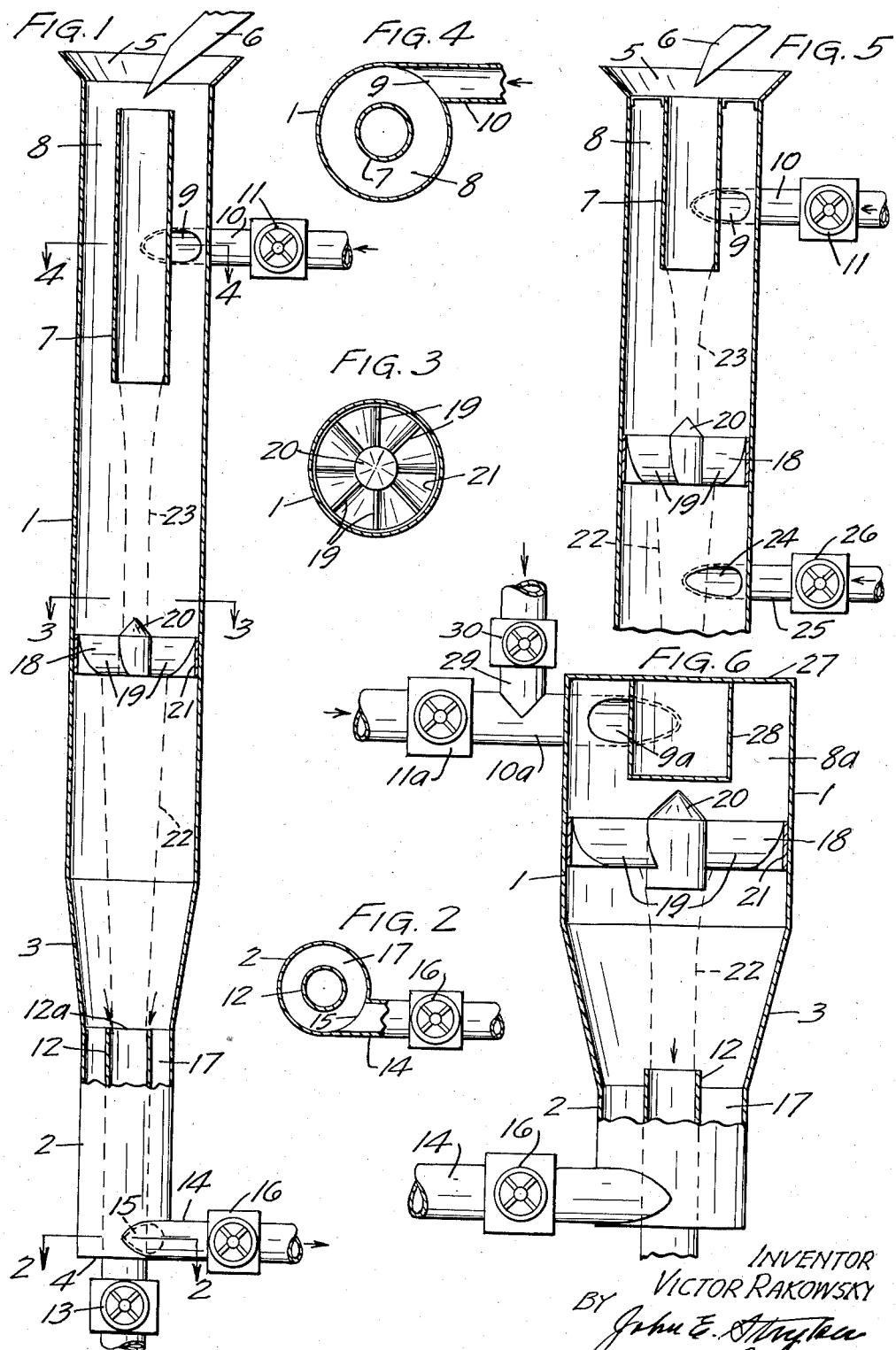
INVENTOR
VICTOR RAKOWSKY
BY
John E. Strythen
ATTORNEY July 15, 1958  V. RAKOWSKY  2,843,265
METHOD OF DENSITY SEPARATION
Filed July 17, 1956  2 Sheets-Sheet 2
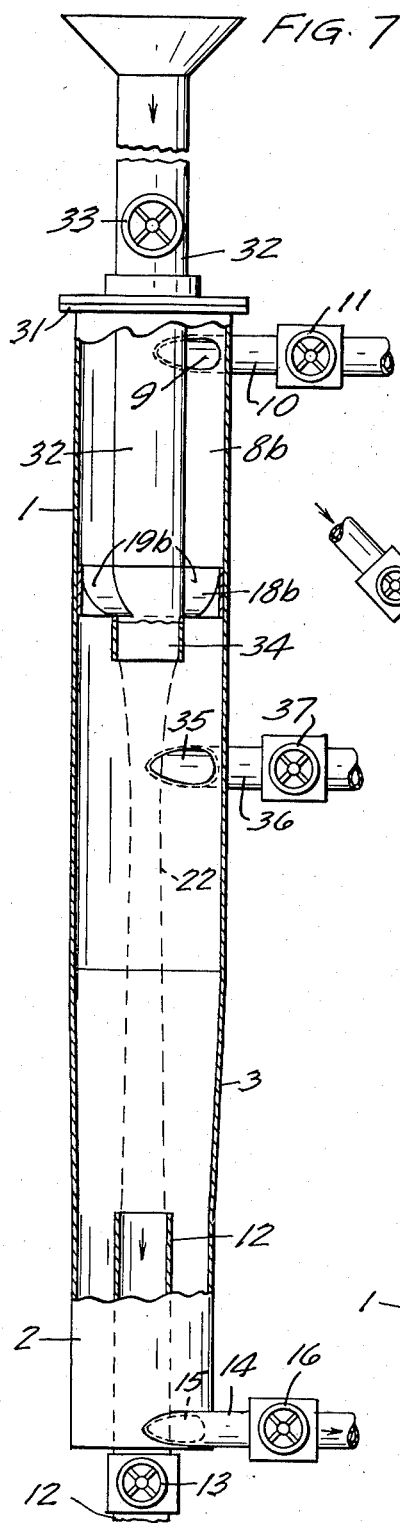
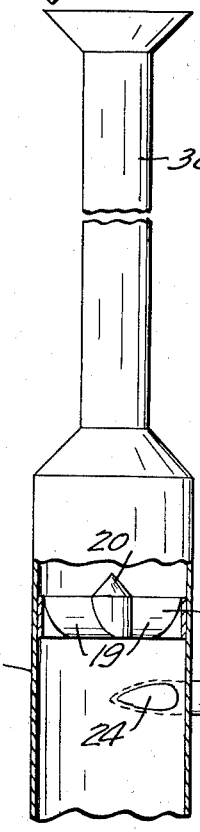
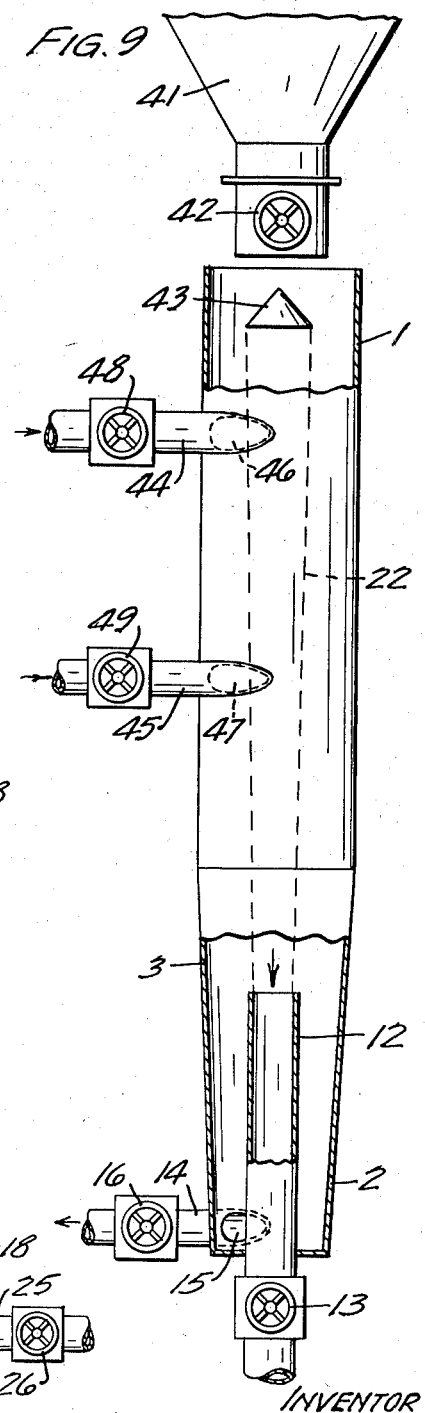
INVENTOR
VICTOR RAKOWSKY
BY
ATTORNEY

United States Patent Office 2,843,265
Patented July 15, 1958

2,843,265

METHOD OF DENSITY SEPARATION

Victor Rakowsky, Rancho Santa Fe, Calif.

Application July 17, 1956, Serial No. 598,435

7 Claims. (Cl. 209—172.5)

This invention relates to the separation of heterogeneous mixtures of solid particles into fractions which differ in specific gravity. As such, it contemplates both processes and apparatus therefor. More specifically, the invention is concerned with improvements in making density separations by immersion of particles in a downwardly spiraling flow of separatory fluid to accomplish separation at a parting gravity higher than the apparent density of the separatory fluid.

For several decades, industry has shown increasing interest in so-called "sink and float" separations of mixtures of solid particles. Progress in this field has included the development of many improvements in processes and equipment for economical separation of particulate solids mixtures into fractions of differing specific gravity. Many successful installations have been, and are being built and operated. However, there is one common feature, at least, which is found in all such processes and equipment. It is the immersion of the particles in some fluid in which the separation is accomplished.

This fluid may take a number of different physical forms. It may be true liquid or solution of sufficiently heavy density. More commonly, it is a heavy-media separatory fluid, i. e., will comprise a suspension of solid "media" particles in a liquid usually water. Ordinarily, these media solids are of a sufficient degree of fineness that the suspension for all practical purposes behaves as a true liquid of high density. It is with the use of such suspension-type, separatory fluid that the present invention is primarily concerned. Hereinafter, the suspended solids will be referred to as "media" or "media solids" and the suspension of solids in liquid as the "medium" or "separatory medium."

In my U. S. Patent 2,726,765 I have discussed many different ways in which gravity separations had been carried out and have also disclosed an improved method and apparatus which is not subject to many practical difficulties which previously were found troublesome. The present invention being an improvement thereover, it should be briefly reviewed.

The separatory process of my patent is essentially simple. It consists in establishing a downward flow of a volume of medium, and imparting to that flow a spiralling motion such that, in falling through a partially confined space, a free vortex is established. A particulate solids mixture to be separated is introduced onto or into an upper level in this vortex. Fluid is discharged from the confined space at differing levels below the level or levels at which the medium and the particles are introduced.

One flow from the confined space, normally the principal flow, is by free flow into a central opening. The latter is of such diameter that it normally does not run full of liquid. This central opening should be above the bottom of the confined space and lead into a vertical, central conduit. This conduit extends upwardly into the confined space from the bottom thereof to some intermediate level, and with the outer walls of the confined space causes the lower part of the latter to have an annular horizontal cross-section. The lighter density fraction, regardless of particle size, is carried into the central opening by a weir overflow, falls down the inner walls of the central conduit and out of the vessel.

At all times, then, a fixed minimum volume of liquid is present in the lower annular confined space, since some overflow into the central opening is always maintained. The heavier density particles are carried outwardly and downwardly into the annular space. They are removed therefrom by some suitable means at a level below that of the central overflow opening, usually at or near the bottom of the annular space.

It will be apparent that the necessary apparatus elements therefor, which will be of concern to the present invention, are fairly few and simple. There must be a containing vessel in which a free vortex can be set up. Within this vessel there must be a central discharge opening into which surface layers of the vortex discharge at an intermediate level. At some higher level there must be provision for introducing the medium so as to form the free vortex. There must be a means for feeding solids, preferably at a level near the top of the free vortex. Means must be provided for removing from the vessel the fluid and lower-gravity particles entering the central discharge opening. There must be means for removing the remaining fluid and higher-gravity particulate material from the annular confined space at some level or levels below that of the central discharge opening.

Of necessity, there will be ancillary equipment for making up and feeding the medium. There will also be means for separating the several particulate solids fractions of differing gravity from the accompanying medium discharged therewith. Usually, also, there will be provision for recovering and reusing the media particles. A discussion of this will be found in my U. S. Patent No. 2,726,763, as well as a discussion of the choice of media. However, many conventional methods and apparatus are known for these purposes, as are the governing factors in choosing the media and preparing the medium. The specific choices made for these purposes are not part of the present invention. Since conventional alternatives are known, they need not be further discussed.

Similarly, those processing limitations of my previous invention which are also of interest here are essentially few and simple. A sufficient flow of medium into the vessel is maintained to insure formation of the vortex profile. In addition, sufficient flow must be maintained into the central discharge opening to carry the necessary proportion of lesser-density solids. Sufficient additional medium should be available to discharge the higher gravity particles fraction which is carried into the lower part of the vessel. These exit flows are easily maintained without disturbing the vortex profile. Finally, as to feeding the particulate material, care must be taken only to the extent that it be done in such manner that no appreciable quantities thereof will fall into the central vortex opening without sufficient treating contact with the medium. So long as these precautions are maintained, there may be considerable flow variation.

Adjustment of the separator for the desired operation is relatively simple. It is the volume of medium flow through the apparatus which is the principal factor. There are several variable adjustments. The entering amount of separatory fluid may be regulated. The rate of fluid removed from the lower part of the annular space may be varied. Either or both may be varied until the central discharge reaches the desired volume.

The average density of the medium employed also may be adjusted if necessary.

By these controls, separation according to my patent at a desired density for a particular solids feed rate is readily brought into adjustment. Once equilibrium is obtained, operation is sufficiently flexible to continue to run for long periods with very little supervision. The treating capacity is tremendous. For example, using a small model about eight inches in diameter and ten inches high, having a central conduit extending upwardly about three inches into the tank to a two inch central opening and a three-quarter inch heavy discharge opening for the heavy fraction, separation at about 2.75 was obtained on 1200–1500 pounds per hour of minus quarter-inch zinc ore. Medium was supplied at about six pounds pressure through a one inch pipe. In larger apparatus, about six feet high by four feet in diameter, with eight inch pipes in both discharge openings 100–150 tons per hour were easily handled.

There is a definite advantage in maintaining a volume of spiralling medium below the central discharge opening. A density gradient apparently develops from the bottom of the vessel to the top. Taken in conjunction with the forces exerted in and by the spiral flow, it is possible to accomplish separation of the particulate mixture into fractions at an apparent parting gravity somewhat higher than the apparent average density of the incoming medium. For example, the specific gravity of separation may be from about 0.02 to about 0.2 higher than the apparent density of the incoming medium.

This ability of the process of my patent to separate the feed at a parting gravity above the density of the medium produces several advantages. For example, within certain obvious limits, the maximum density of a medium prepared from specific media is dependent on the density of the latter. Unfortunately, it is usually true that the higher the density of the media solids needed to make up a medium of the required apparent gravity, the greater the cost. Therefore, this ability of my earlier process in some cases permitted avoiding the extra cost of using more expensive media merely to increase the apparent density of the medium by the small amount required in excess of the maximum obtainable with more economical media.

This is a definite advantage of my earlier process. However, the spread between the maximum practical medium density obtainable with specific media and the maximum gravity of separation obtainable in the process of my patent with that medium was not as wide as might be sometimes desired. If this "spread" could be increased, it would greatly extend the applicability of my process. It would permit commercial operation in a number of cases which would require the use of more expensive media, but economically could not justify their use.

It is, therefore, a principal object of the present invention to modify the process and apparatus of my previously-discussed invention in such a way as to markedly increase the spread which can be obtained between the apparent average density of the medium and the parting gravity at which separation can be actually carried out. This should not require extensive modification of existing apparatus or the installation of excessive ancillary equipment.

In accordance with the present invention, these objects have been surprisingly well accomplished by a modification of my previously disclosed process. This modification consists in suddenly applying an angular deflection to the downwardly spiralling medium while the gravity separation of the particles is actually taking place. This deflection may be applied by purely mechanical means, by a sudden increase in the amount of spiralling flowing fluid, or by combinations of both. In this way, it is quite feasible to increase the spread between the medium density and the separation gravity by as much as 0.8. This represents an increase on the order of 0.3 over the spread previously considered possible.

The invention will be more fully explained with reference to the accompanying drawings, in which:

Figure 1 is a part elevational and part vertical sectional view showing one form of separator utilizing the principles of the present invention and having a mechanical deflector;

Figs. 2, 3 and 4 are horizontal sectional views taken on the lines 2—2, 3—3, and 4—4 of Fig. 1;

Fig. 5 is a part elevational and part vertical sectional view showing a modification of the separator wherein both mechanical and hydraulic deflectors are utilized;

Fig. 6 is a part elevational and part vertical sectional view showing a further modification of the apparatus having a mechanical deflector and wherein the particulate material and medium are introduced into the separator as a mixture;

Fig. 7 is a part vertical sectional view and part elevational view showing a further modification of the apparatus wherein particulate material is fed to the flowing medium at a level below a mechanical deflector and wherein a hydraulic deflector is provided at a level below that of the feed;

Fig. 8 is a part elevational view and part sectional view showing a further modification wherein static pressure created by a column of mixed feed material and medium is utilized to increase the angular deflection of the slurry in the separator, and Fig. 9 is a similar view showing a modification of the apparatus wherein an hydraulic deflector is utilized to produce a sudden increase in the spirally flowing fluid.

As shown in Fig. 1, the illustrated apparatus comprises an outer shell having an upper cylindrical section 1 connected to a smaller cylindrical base section 2 by an intermediate conical section 3. These shell sections enclose a horizontally confined space having a bottom closure 4 and a top opening 5. The particulate material to be treated may be fed into the opening 5 at a controlled rate through a chute 6. Mounted concentrically within the upper portion of the section 1 is a cylindrical section 7 forming with the section 1 an annular space 8. Liquid separatory medium is introduced tangentially into the space 8 through a port 9 supplied from a conduit 10 under control of suitable means for adjusting the flow rate of the medium entering the separatory vessel. Such control is indicated diagrammatically at 11.

A discharge conduit 12 having an intake opening 12a at its upper end extends downwardly from an elevation above the bottom closure 4 coaxially with the shell section 2 and out through a port formed in the closure 4. Conduit 12 with its centrally located intake opening 12a constitutes a central vortex discharge for the lower density product of the separation. The rate of discharge through the conduit 12 is under control of a suitable gate or valve 13. Communicating with the lower portion of the annular confined space through a port 15 is a conduit 14 for the higher density product and flow through this conduit is under control of a valve 16. The port 15 communicates with an annular space 17 defined by the conduit 12 and lower section of the shell and extends through the lower side wall near the bottom closure 4. Port 15 may be either tangentially or radially disposed with respect to the annular space 17.

A mechanical deflector, indicated generally by the numeral 18, is provided within the separatory vessel at an elevation intermediate the upper end of the conduit 12 and medium inlet port 9. This deflector comprises a multiplicity of circumferentially spaced vanes 19 radiating from a closed centrally located core 20 and each formed with an upper deflecting surface inclined at such an angle as to impart a sudden angular and lateral deflection to the downwardly swirling separatory medium. The upper surfaces of the vanes 19 are preferably concavely curved and the angle of deflection determined by these surfaces is selected to impart the required increase of angular velocity and to vertically compress the spiral path of flow. The number and spacing of the vanes is proportioned to the diameter of the separatory vessel and with a view to intercepting the entire flowing mass and affording sufficient space between vanes to permit the free passage of all particles of the mixture to be separated.

The inner edges of the vanes may be secured to the core 20 by welding or by other means and their outer edges may be connected together by a ring 21 attached to the cylindrical section 1 of the separator at a suitable elevation above the upper end of the vortex discharge conduit 12. Adequate resistance to abrasion may be imparted by coating the surfaces of the vanes with a durable rubber or rubber-like composition.

In operation, fluid medium is introduced through the conduit 10 and port 9 into the annular space 8 in sufficient volume to substantially fill the separatory vessel and at sufficiently high velocity to create and maintain a downwardly open vortex such as that indicated at 22 below the deflector 18 and extending into the upper end of the discharge conduit 12. Under some conditions, a second vortex 23 may be formed above the deflector 18. Entering tangentially, the fluid medium moves spirally down and around the inner walls of the vessel until the lower annular space 17 is filled. So long as this annular space is maintained filled, a weir overflow into the upper end and down the inner surface of the conduit 12 will be obtained. Fluid medium is also continuously discharged through the conduit 14 under control of the valve 16.

When the downwardly spiraling flow encounters the vanes 19, the vertical pitch of the spiral path is suddenly reduced and the angular velocity of the fluid is increased. The resulting vertical compression of the spiral path increases time of residence and total distance traveled by the fluid while within the confined space. The effect is to increase the apparent separatory suspension density at the outer surface of the confined flow and decrease the apparent separatory density at the central vortex surface. In order to establish and maintain this desirable condition, suitable adjustments are made in the angular deflection of the vanes 19, the rate of input of medium through the port 9 and the rate of discharge of the medium through the conduits 12 and 14.

Adjustments of the deflection and flow rates are made until a test of the specific gravity of the medium being discharged from the conduit 14 shows that the desired spread between the medium density and the separation gravity has been attained. Then particulate material is fed into the cylindrical section 7 and is discharged into the whirling body of medium above the deflector 18. In this body the particulate material is thoroughly mixed with the medium and some density separation takes place. Thereupon the whirling fluid mixture passes downward between the deflector vanes 19 and the final separation is effected in the confined space below the deflector.

Due to the whirling action and high density of the fluid, lower gravity particulate material is carried around and down at or near the surface of the whirlpool vortex and is discharged through the central conduit 12. The higher density particles are carried out into and down through the outer part of the fluid into the annular space 17 between the conduit 12 and section 2 of the separatory vessel. Flow through the discharge conduit 14 is regulated by the valve 16 so that substantially all of the heavy density material is discharged from the annular space 17 through this conduit.

Referring to the modification shown in Fig. 5, this has a separatory vessel having an outer shell similar to that shown in Fig. 1. Particulate material is introduced through a chute 6 into the open upper end of the shell and cylindrical sections 1 and 7 define an annular space 8 into which the medium is introduced through port 9 from a conduit 10 under control of a valve 11. At a lower elevation, a deflector 18, like that shown in Fig. 1, is mounted within the cylindrical section. In this modified apparatus provision is made for introducing additional medium tangentially into the shell section 1 at an elevation below the deflector 18. Thus there is a port 24 through which medium is introduced tangentially. Medium is supplied to the port 24 by a conduit 25 under control of a valve 26.

The lower portion of the vessel for the modification shown in Fig. 5 may be constructed as shown in Fig. 1. The connecting conduits and controls may include a vertical conduit 12 for withdrawing the lower density material and a conduit 14 for withdrawing the high density product from the annular space 17. In operation, medium supplied through the conduit 25 and port 24, produces a sudden increase in the volume of the spirally flowing medium. Thus, the effect of the mechanical deflector 18 is augmented by the hydraulic deflection afforded by the sudden increase in tangential flow from the port 24.

A further modification is shown in Fig. 6 whereby the height of the separatory vessel may be reduced. In this modification the separatory vessel has a closed top 27 and a concentric cylindrical section 28 depends from the top 27 and is closed at its bottom. This section forms, with the section 1, an annular space 8a into which a mixture of medium and particulate material is introduced tangentially through a port 9a and conduit 10a. Flow of medium through the conduit 10a is under control of a valve 11a. Particulate material to be separated is introduced into the conduit 10a through a branch conduit 29 and a valve 30 is provided to control the rate of feed through conduit 29.

From the annular space 8a a mixture of feed material and medium flows spirally down to a deflector 18 having vanes 19 and core 20 generally similar to those of the mechanical deflectors shown in Figs. 1 and 5. In general, the modification shown in Fig. 6 has a separatory vessel which is larger in diameter in proportion to its height as compared with those of the other modifications. Provision is made for the lighter fraction product to be discharged together with some of the medium through a central vortex pipe 12, while the heavier fraction product and some of the medium is discharged through a conduit 14 under control of a valve 16. Similar means are provided for the discharge of the products from the separatory vessels of each of the several modifications.

In the modification shown in Fig. 7, section 1 of the separatory vessel has a top closure 31 and a central opening in this closure is provided to receive a feed pipe 32. Particulate material to be separated is fed into the upper end of the pipe 32 and flow through this pipe to the separatory vessel is under control of a valve 33. Pipe 32 extends downwardly to an intermediate elevation within the cylindrical section 1, concentrically therewith, and has a lower end opening 34. A mechanical deflector 18b is mounted above the opening 34 and has vanes 19b extending spirally down at a pitch designed to impart the required sudden deflection of the slurry flowing spirally down from an annular space 8b defined by the pipe 32 and cylindrical section 1 of the separatory vessel. Each of the vanes 19b extends from the pipe 32 spirally down so that the fluid medium is given a sudden increase in deflection at an elevation above and near the opening 34 from which the particulate material is fed into the face of the vortex 22 below.

Medium is introduced tangentially into the annular space 8b near its upper end through a conduit 10 and port 9 under control of a valve 11. By such means the medium is caused to flow spirally around in the annular space 8b and then to pass between the vanes 19b of the deflector 18b which impart to it a sudden increase in angular deflection. Additional medium is introduced through a port 35 tangentially at an elevation below the opening 34 and above the central vortex opening in the conduit 12. Port 35 is supplied with medium under suitable pressure from a conduit 36 under control of a valve 37. This additional tangentially flowing medium produces a further increase in the angular deflection and volume of medium flowing spirally around and down in the separatory vessel.

In the further modification shown in Fig. 8, the cylindrical section 1 of the separatory vessel is provided with a vertically elongated extension 38 into which a mixture of fluid medium and particulate material is introduced through a conduit 39 under control of a valve 40. The extension 38 rises to an elevation sufficiently high to create in the upper portion of the separatory vessel a substantial static pressure head. This extension may be kept filled with the mixture of feed material and medium or other liquid to an elevation of 20 feet or more, for example. Instead of mixing a fluid medium with the particulate material, a column of the latter in the form of a thick slurry may be maintained in the extension 38.

Thus substantial static pressure is maintained on and above a mechanical deflector 18 mounted in the upper portion of the separatory vessel. Additional medium is introduced tangentially at an elevation immediately below the deflector 18. This additional medium is introduced through a port 24 which is supplied through a conduit 25 under control of a valve 26, as in the modification shown in Fig. 5. Low density and high density products are discharged from the lower portion of the separatory vessel by means and in a manner similar to those described with reference to Fig. 1, for example.

Fig. 9 illustrates a still further modification wherein an hydraulic deflector is substituted for the mechanical deflectors hereinbefore described. Cylindrical section 1 of the separatory vessel is open at the top and particulate material to be separated is fed into the top of section 1 from a hopper 41 under control of a valve 42. To prevent the feed material from passing directly down the open vortex 22, I provide a conical baffle 43 which is supported concentrically in section 1 above the confined space in which an open vortex is to be maintained. Fluid medium is introduced into the separatory vessel tangentially at a plurality of elevations. For this purpose conduits 44 and 45 are adapted to supply fluid medium to ports 46 and 47 respectively. These ports are spaced apart vertically of the separatory vessel a substantial distance and valves 48 and 49 are provided to control the rate of flow through the respective conduits and ports into the confined space.

Operation of the modification shown in Fig. 9 is generally similar to that of the other forms of the separatory apparatus. Fluid medium is introduced through the conduit 44 and port 46 so that a flow is established spirally around and down within the vessel at sufficient angular velocity to create a downwardly open vortex 22. Medium is then introduced tangentially through the lower conduit 45 and port 47 to create a sudden increase in the angular velocity at this lower elevation. This has the effect of vertically compressing the spiral path of flow while increasing the total distance traveled by the fluid within the confined space. As a result, the separatory suspension density is increased at the outer surface of the combined flow and the density at the central vortex surface is decreased.

Flow in through the conduits 44 and 45 is adjusted until the apparent density of the medium at the outer boundary of the confined flow approaches the desired separating density. Particulate material is then fed from the hopper 41 into the separatory vessel at a controlled rate. The several heavier and lighter fractions of the medium are discharged as hereinbefore described through the conduits 12 and 14. Further adjustments of the rate of discharge and rate of introduction of the feed material and medium may be made until the required adjusted length of spiral path and angular velocity of flow are maintained during the continuation of the operation.

Similar adjustments are made with each of the several modified forms of the separatory apparatus. By this method a relatively wide spread may be obtained between the average specific gravity of the feed solids and that of the concentrate.

EXAMPLES

To demonstrate the effectiveness of the present process in spreading the differential between the average specific gravity of the feed solids and that of the concentrate and thereby up-grading the concentrate, treatment of a domestic iron ore presents the typical problems. Illustrative results of many tests using differing size ranges and feed rates are shown in the table below.

In making these tests, a vertical unit about 9 feet high and 13 inches in diameter was used, the top one foot flared out to about a 24 inch diameter at the top edge. The top was closed except for an air inlet. It was surmounted by a 2.5 cubic yard feed bin having a conical bottom with a one foot discharge port directly into the top of the separatory unit. Solids were fed at rates up to about 90 tons per hour. Different size ranges were tested. The average medium density was 2.48. Feed and medium were commingled about 8 inches below the top. Deflecting medium was introduced by means of a six inch centrifugal pump through a 3 inch diameter tangential port about 2 feet below the top of the unit. The bottom four feet of the unit tapers to about a ten inch diameter at the bottom. The heavy fraction was discharged tangentially at the bottom through an adjustable gate into a large launder. The light fraction was centrally discharged through the bottom by an open four inch pipe extending vertically upward into the unit for about two feet.

Table

| Example No. | Feed Size[1] | Feed Rate, Tons/Hr. | Specific Gravity | | | Percent Iron Content | | |
|---|---|---|---|---|---|---|---|---|
| | | | Feed | Conc. | Tails | Feed | Conc. | Up Grade |
| 1 | A | 20 | 2.46 | 3.08 | 2.55 | 49.5 | 61.5 | 12.0 |
| 2 | A | 40 | 2.47 | 3.09 | 1.90 | 48.0 | 59.4 | 11.4 |
| 8 | C | 20 | 2.58 | 3.06 | 2.26 | 45.2 | 61.2 | 16.0 |
| 7 | B | 87 | 2.49 | 3.17 | 2.24 | 44.2 | 60.4 | 16.2 |
| 6 | B | 79 | 2.40 | 3.25 | 2.18 | 43.8 | 62.4 | 18.6 |
| 5 | B | 79 | 2.45 | 3.18 | 1.79 | 48.1 | 62.1 | 14.0 |
| 3 | A | 54 | 2.50 | 3.08 | 1.80 | 47.3 | 59.0 | 11.7 |
| 4 | A | 55 | 2.49 | 3.09 | 1.78 | 37.1 | 60.0 | 21.9 |
| (Average) | | | 2.485 | 3.125 | 2.062 | 45.4 | 60.75 | 15.225 |

[1] Note.—Feed size ranges—U. S. Standard. A = minus one inch plus 3/16 inch. B = minus 3/16 inch plus 48 mesh. C = total minus one inch.

From a comparison of the specific gravity of the feed with that of the concentrate, it will be evident that the average spread for the eight test examples was 0.64, the maximum spread (Example 6) was 0.85 and the minimum spread (Example 8) was 0.48. The latter test shows the feasibility of employing my method to obtain separation with ore feed sizes of total minus one inch. More outstanding results were obtained in the other tests where more limited ranges of ore feed sizes were used.

I claim:

1. In separating a mixture of particulate materials into fractions of differing average specific gravities respectively higher and lower than a selected separating density by a process wherein said mixture is introduced into a separatory medium of predetermined apparent density which is flowing into and spirally around and down within a horizontally confined space at a sufficient angular velocity to create an open downward free vortex, a substantial volume of slurry comprising the flow concentric with and including the open vortex center being discharged downwardly and out of the confined space from an intermediate level therein and the remaining flow being continued around and down within said space and discharged from a level below that of said vortex discharge; the improved method of increasing the separating density which comprises: (a) applying to said spirally flowing separatory medium at a level above that of said central vortex discharge an angular deflection sufficient to increase the angular velocity thereof and vertically compress the spiral path of flow, whereby, (1) the spiral path of flow within said confined space is appreciably lengthened, (2) the apparent separatory suspension density at the outer surface of the confined flow is increased and (3) the apparent separatory suspension density at the central vortex surface is decreased; (b) adjusting said angular deflection, with resultant adjustment in angular velocity, and length of spiral path of flow, until the apparent density of the medium at the outer edge of said confined flow approaches the desired separating density; (c) feeding the particulate material mixture to be separated to the flowing medium (d) and controlling the medium input and discharge rates so that both the adjusted length of spiral path and the adjusted angular velocity are substantially maintained, whereby the average specific gravity of the particulate material in said lower level discharge from said confined space is markedly increased over the maximum average value obtainable in the absence of said angular deflection.

2. A process according to claim 1 in which the particulate material is fed to said flowing medium at a level above that at which said angular deflection is applied.

3. A process according to claim 1 in which the particulate material is fed to said flowing medium at a level below that at which said angular deflection is applied.

4. A process according to claim 1 in which said angular deflection is applied by inserting a multi-segmented, spiral-vane deflector across said spirally downward flowing fluid at a level above that of said central vortex discharge.

5. A process according to claim 1 in which said angular deflection is applied by introducing a flow of medium into said confined space (a) at a level substantially below the top of said confined space but substantially above the level of said central vortex discharge, (b) at an angle which is (1) substantially tangential to the outer surface of said confined space and (2) substantially more nearly horizontal than the mean path of said spiral flow.

6. A process according to claim 4 in which the multi-segmented, spiral-vane deflector is inserted in said confined space at a level above that at which said flow of medium is introduced.

7. A process according to claim 6 in which medium is introduced into said confined space at levels both above and below said spiral-vane deflector.

References Cited in the file of this patent

UNITED STATES PATENTS

| | | |
|---|---|---|
| 2,726,765 | Rakowsky | Dec. 13, 1955 |
| 2,767,624 | Hoesch | Oct. 23, 1956 |